United States Patent
Gan

(10) Patent No.: US 9,813,319 B1
(45) Date of Patent: Nov. 7, 2017

(54) METHOD OF DETECTING PACKET LOSS IN A COMMUNICATION NETWORK

(71) Applicant: Sprint Spectrum LP, Overland Park, KS (US)

(72) Inventor: Seng Gan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 729 days.

(21) Appl. No.: 14/088,160

(22) Filed: Nov. 22, 2013

(51) Int. Cl.
*H04L 12/26* (2006.01)

(52) U.S. Cl.
CPC ................ *H04L 43/0829* (2013.01)

(58) Field of Classification Search
CPC ....................................................... H04L 12/26
See application file for complete search history.

(56) References Cited

U.S. PATENT DOCUMENTS

| | | | |
|---|---|---|---|
| 6,392,993 B1 * | 5/2002 | Hamilton | H04L 12/1877 370/230 |
| 8,233,483 B2 | 7/2012 | Enomoto et al. | |
| 2003/0066016 A1 * | 4/2003 | Wehage | H04L 1/0061 714/781 |
| 2009/0016366 A1 * | 1/2009 | Endo | H04L 45/00 370/401 |
| 2010/0220709 A1 * | 9/2010 | Peisa | H04L 1/1848 370/345 |
| 2012/0163161 A1 * | 6/2012 | Zhang | H04L 1/1874 370/216 |
| 2014/0369351 A1 * | 12/2014 | Singh | H04L 49/9057 370/390 |

* cited by examiner

*Primary Examiner* — Charles C Jiang
*Assistant Examiner* — Thad Defauw

(57) ABSTRACT

Systems and methods for detecting packet loss in a communication network are provided. A first network element can determine that a first group of packets meets an observation threshold. The observation threshold can comprise a predetermined number of packets in a sequence. A first timer can be initiated when the first group of packets meets the observation threshold. A first packet can be detected at the first network element after the first timer is initiated. The first timer can be re-initiated when the first packet is detected at the first network element before the first timer expires and the first packet comprises a packet in the sequence greater than a last detected packet. A first packet loss can be determined when the first packet is not a next packet in the sequence.

14 Claims, 7 Drawing Sheets

METHOD OF DETECTING PACKET LOSS IN A COMMUNICATION NETWORK

TECHNICAL BACKGROUND

In packet-based communication networks, one or more packets may not be delivered to the intended recipient causing packet loss throughout the network. Various factors can result in packet loss such as packet damage, signal degradation, network congestion, faulty networking hardware, etc.

Depending on the type of application running on the intended recipient device, packet loss can result in significant performance issues. Non-delay sensitive applications such as email, SMS text, etc. can request retransmission of lost packets without introducing performance issues to the receiving user. However, for delay sensitive applications such as streaming video, voice over IP, online gaming, video conferencing, etc., distribution times do not necessarily allow for retransmission requests when packet losses occur. The received data including packet loss can introduce jitter and can lead to undesirable deterioration in communication.

Packet loss within a network can provide an indication of network health. For example, packet loss can indicate that a network node, such as a router, is no longer effectively routing packets throughout the network due to device deficiencies. One way packet loss can be detected is using a plurality of observations points. A first observation node can be associated with the input of the network node. Then all output points of the network node can be monitored. For a multi-path, load distributed network, the network node can have a plurality of output points. Such packet loss monitoring process can use significant resources while still being inaccurate because a packet can successfully be transmitted from an output point of the network node but not be observed being transmitted based on the number of output points that can be monitored simultaneously.

OVERVIEW

Systems and methods for detecting packet loss in a communication network are provided. A first network element can determine that a first group of packets meets an observation threshold. The observation threshold can comprise a predetermined number of packets in a sequence. A first timer can be initiated when the first group of packets meets the observation threshold. A first packet can be detected at the first network element after the first timer is initiated. The first timer can be re-initiated when the first packet is detected at the first network element before the first timer expires and the first packet comprises a packet in the sequence greater than a last detected packet. A first packet loss can be determined when the first packet is not a next packet in the sequence.

Systems and methods for detecting packet loss in a communication network are provided. A first counter can be incremented each time a sequential packet is observed at an observation node in the communication network. A first timer can be initiated when the first counter meets an observation threshold. The observation threshold can comprise a predetermined number of packets in a sequence. A first packet can be observed at the observation point after the first timer is initiated. The first timer can be re-initiated when the first packet is observed at the observation node before the first timer expires and the first packet comprises a packet in the sequence greater than a last detected packet. A first packet loss can be determined when the first packet is not a next packet in the sequence.

DETAILED DESCRIPTION

Figure 1:
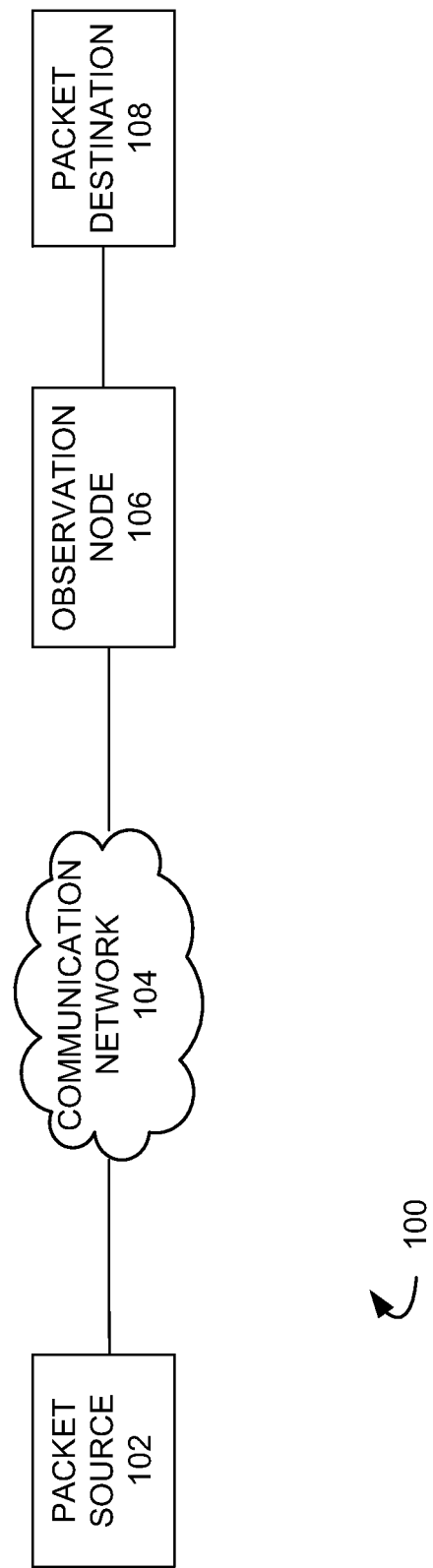
FIG. 1 illustrates a communication system to detect packet loss in a communication network.

FIG. 1 illustrates an exemplary communication system 100 for detecting packet loss in a communication network. Communication system 100 can comprise a packet source 102, a communication network 104, an observation node 106, and a packet destination 108. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between packet source 102 and packet destination 108, which are omitted for clarity, including additional processing nodes, routers, gateways, and physical and/or wireless data links for carrying data among the various network elements.

Packet source 102 can be any network device configured to transmit packets over communication system 100. For example, packet source 102 can comprise at least one of a wireless device, a processing node, router, gateway, server, database, base station, base station controller, mobile switching center, dispatch application processor, location register, etc. Packet source 102 can have a wired or wireless interface. Packet source 102 can implement any protocol that uses sequence numbers. For example, packet source 102 can use transport control protocol (TCP), user datagram protocol (UDP), etc.

Packet source 102 can comprise a processor and associated circuitry to execute or direct the execution of computer-readable instructions to obtain information. Packet source 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Packet source 102 can receive instructions and other input at a user interface.

Communication network 104 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 104 can be capable of carrying data, for example, to support voice, push-to-talk, and data communications by packet source 104. Network protocols can comprise wireless protocols such as code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Alternatively, wired network protocols can be utilized by communication network 104 such as Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 104 can also comprise additional base stations, controller nodes, telephony switches, internet routers, network gateways, computer systems, communication links, or some other type of communication equipment, and combinations thereof.

Observation node 106 can be any network node configured to observe packets transmitted over communication system 100. Observation node 106 can be a stand-alone device such as a network monitoring or testing device or observation node 106 can be integrated into any other network node within communication system 100. While illustrated as a separate device, observation node 106 could be incorporated into packet source 102 and/or packet destination 108. Packets that are transmitted over system 100 can be observed, monitored, and/or detected by observation node 106 in order to determine whether packet loss has occurred. Observation node 106 can be disposed such that packet loss can be determined at a single point in the network. For example, as illustrated in FIG. 1, observation node 106 can be positioned at an input point of a network node such as packet destination 108. Alternatively, observation node could be positioned at an output point of a network node, such as at the output of packet source 102.

Observation node 106 can comprise a processor and associated circuitry to execute or direct the execution of computer-readable instructions to obtain information. Observation node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Observation node 106 can receive instructions and other input at a user interface.

Packet destination 108 can be any network device configured to receive packets over communication system 100. For example, packet destination 108 can comprise at least one of a wireless device, a processing node, router, gateway, server, database, base station, base station controller, mobile switching center, dispatch application processor, location register, etc. Packet destination 108 can have a wired or wireless interface. Packet destination 108 can implement any protocol that uses sequence numbers. For example, packet destination 108 can use transport control protocol (TCP), user datagram protocol (UDP), etc.

Packet destination 108 can comprise a processor and associated circuitry to execute or direct the execution of computer-readable instructions to obtain information. Packet destination 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Packet destination 108 can receive instructions and other input at a user interface.

In operation, packet source 102 can transmit a data flow comprising a plurality of packets. The packets can be transmitted such that each packet is associated with a sequence. For example, each packet can comprise an indication of a single sequence number (e.g., 1, 2, 3, etc.) or each packet can comprise an indication of a range of sequence numbers (e.g., 1-99, 100-199, etc.) A first network element, such as observation node 106 can determine that a first group of packets meets an observation threshold. The observation threshold can comprise a predetermined number of packets in a sequence. A first timer can be initiated at the observation node 106 when the first group of packets meets the observation threshold. A first packet can be detected at observation node 106. The first timer can be re-initiated at the observation node 106 when the first packet is detected at the observation node 106 before the first timer expires and the first packet comprises a packet in the sequence greater than a last detected packet. When the first packet is not a next packet in the sequence, the observation node 106 can determine that a first packet loss has occurred.

The observation node 106 can use the determination of a packet loss for various operations. In an exemplary embodiment, the observation node 106 can use a packet loss determination to monitor the status of the communication system 100. The observation node 106 can maintain a record of all packet loss determinations and when the number of packet loss determinations meets a threshold, the observation node 106 can determine that hardware malfunctions can be causing the packet losses or to identify undesired network congestion in order to reroute packets within the system 100.

Figure 2:
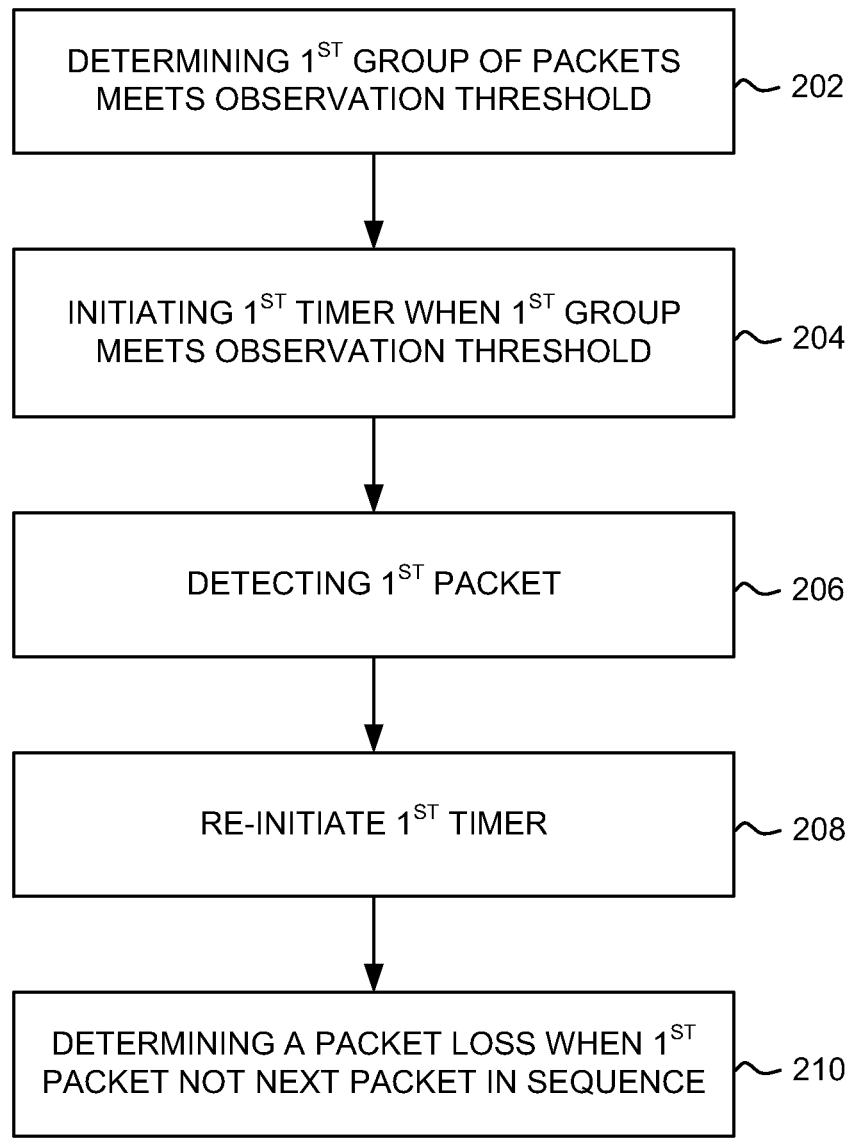
FIG. 2 illustrates an exemplary method of detecting packet loss in a communication network.
Figure 3:
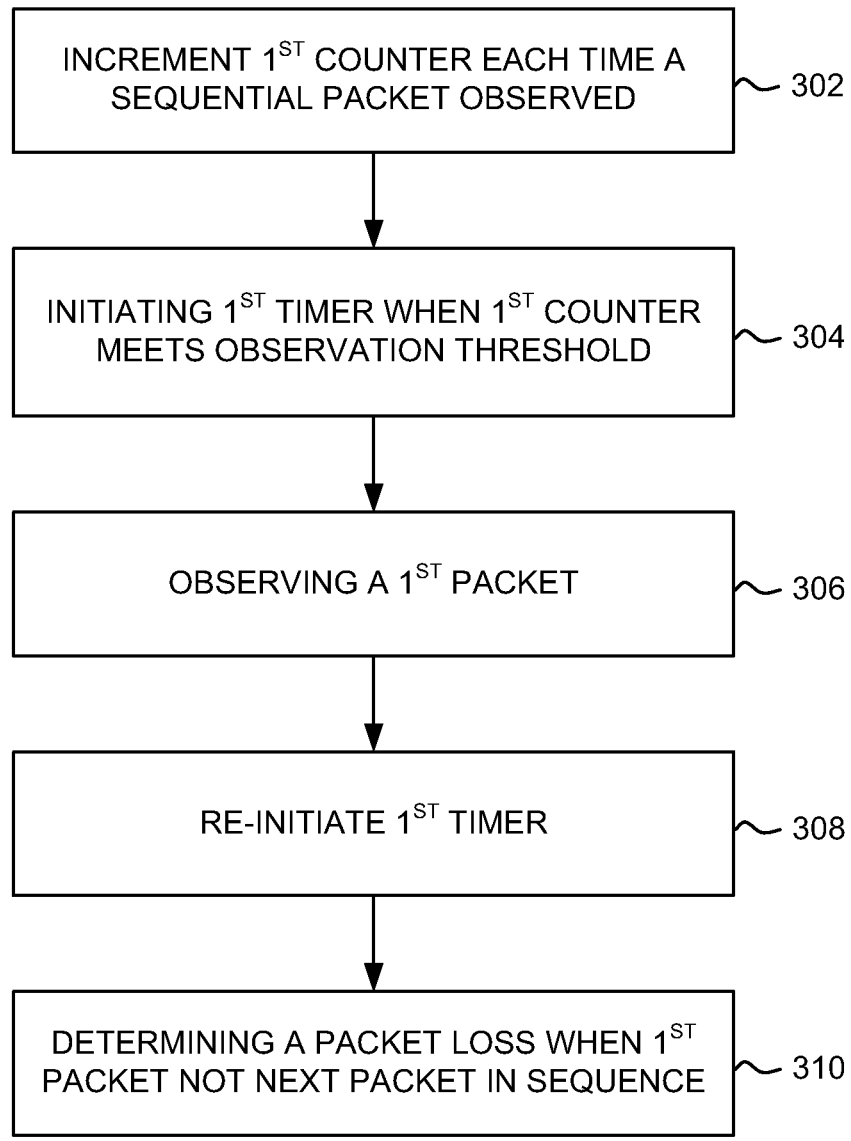
FIG. 3 illustrates another exemplary method of detecting packet loss in a communication network.

FIGS. 2 and 3 illustrate flow charts of exemplary methods of detecting packet loss in a communication network. The methods will be discussed with reference to the exemplary communication system 100 illustrated in FIG. 1. However, the methods can be implemented with any suitable communication system. In addition, although FIGS. 2 and 3 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A first network node can determine that a first group of packets meets an observation threshold at 202. In other words, until the first group of packets meets the observation threshold, packet loss determination is not initiated. For example, packet source 102 can send a data flow comprising a plurality of packets in a sequence. The observation threshold can comprise a predetermined number of packets in a sequence, where the predetermined number of packets in the sequence is less than the data flow transmitted by packet source 102. For the purpose of this application, packets in a sequence can be any group of packets such that each adjacent packet is a single increment in the protocol sequence. For example, when the packets include an indication of a sequence such that each packet is a single increment the sequence could be increments of one such as 1, 2, 3, 4, 5, etc. Alternatively, the sequence could decrement where the first packet transmitted could be for example 5, the second packet transmitted could be 4, etc. When the packets include an indication of a range of values, the sequence could be increments of the predetermined range such as 1-99, 100-199, etc. The sequence can start at any value. The observation node 106 can determine the sequence based on the header of the packets.

The observation threshold can be selected to comprise any number of packets and can be based on at least one of network conditions, packet protocol, and network load balance sequences. For example, the predetermined number of packets can relate to the size of the data flow such that the predetermined number of packets is enough to prevent false positive packet loss determinations. In an exemplary embodiment, data flows of a significant size generally maintain packet sequence as the flows are transmitted throughout the network. Data flows comprising a small number of packets tend to initiate false positives during packet loss detection. Therefore, the observation threshold can comprise a predetermined number of packets in a sequence such that when the observation threshold is met, it is indicative of a data flow in which the packet sequence will be maintained as it is transmitted throughout the system 100.

In an exemplary embodiment, such as a multi-path, load distributed network, the observation threshold can be greater than a network defined transport size of each portion of the load distributed data flow. For example, when a data flow is segmented into a plurality of load distributed transport groups, the group size is based on a predetermined group size selected by, for example, a network operator. In a multi-path, load distributed network, the observation threshold should be selected to be greater than the network defined transport size in order to prevent false positive indications of packet loss because the transport size can be selected such that a plurality of transport groups could be transmitted over the same path where each group is in sequence however the sequence does not continue between the two groups. For instance, when the transport size is selected to be three packets and a first transport group 1, 2, 3, and a third transport group 7, 8, 9, are transmitted over a first path and a second transport group 4, 5, 6, is transported over a second path, if an observation threshold is selected to be three or less, a false positive packet loss indication would be generated because the observation node would determine that a packet loss occurred after receiving packet 7 because it was not in the next in the sequence of 1, 2, 3. However, all of the packets could be successfully received by the packet receiver 108 in the correct sequence. Therefore, in this exemplary embodiment, the observation threshold should be selected to be 4 or more.

At 204, a first timer can be initiated when the first group of packets meets the observation threshold. For example, a timer can be initiated at the observation node 106 when the number of packets observed by the observation node 106 meets the predetermined number of packets in a sequence. In an exemplary embodiment, when the predetermined number of packets in a sequence is selected to be three, the first timer can be initiated after the first packet in the sequence, the second packet in the sequence, and the third packet in the sequence are observed by the observation node 106. For instance, the timer can be initiated after the third packet in the sequence is observed.

The time period of the timer can be selected based on various factors such as network congestion, round trip packet times, retransmission timeout, communication timeout, and/or rerouting timeout. The time period of the timer can start after the successful receipt of a previous packet. For example, when the time period is based on the round trip packet time, the time period can be selected to be slightly greater than twice the round trip transmission time such that the observation node 106 can determine that the packet is in fact lost and not just delayed in transmission when the time period expires and the next packet has not yet been received.

A first packet can be detected at the observation point at 206. The first packet can comprise a packet that is not the next packet in the data flow sequence or a packet that is the next packet in the data flow sequence. The data flow can comprise redundant or duplicate packets for each packet in the flow. Therefore, after the observation threshold is met, the next packet that is detected can be a duplicate packet of one of the packets already accounted for in the observation threshold. When the packet is not the next packet in the data flow sequence, the second packet can be less than or equal to the last received packet or greater than the next packet in the sequence.

In an exemplary embodiment, when a data flow comprises a sequence of seven packets and the observation threshold is three packets, when the first, second, and third packets are detected or observed at the observation point, the timer can be initiated. The next packet that is detected or observed at the observation point can be a redundant packet such that the first, second, and/or third packet. The next packet detected could also be the fourth packet in the sequence. Alternatively, the next packet detected could be the fifth packet.

The first timer can be re-initiated when the first packet is detected at the first network element before the first timer expires and the first packet comprises a packet in the sequence greater than the last detected packet at 208. For example, when the observation node 106 receives the next packet in the sequence, the first timer can be re-initiated. In an exemplary embodiment, to continue the example above, when the observation threshold is selected to be three and packet four is the next packet received before the first timer expires, the first timer can be re-initiated. Alternatively, if the next packet received is packet one, two, or three, the timer continues to elapse until a packet greater than the last received packet is received.

In another exemplary embodiment, no further packets can be detected or observed. In this case, after the timer elapses, the observation threshold can be reset. When no further packets are received, it can be determined that the data flow comprises no further packets and the data flow is now complete.

At 210, a first packet loss can be determined when the first packet is not a next packet in the sequence. To further continue the above example, when the last packet received at the observation point is the fourth packet and the fifth packet is not received at observation node 106 before the timer elapses, the observation node 106 can determine that a packet loss has occurred. When the next packet received is the first, second, third, or fourth packet, the observation node 106 can re-set the observation threshold after the timer elapses. When the next packet received is the sixth or seventh packet, the observation node 106 can determine that a packet loss has occurred and re-set the timer and await the next packet in the sequence. In an alternative embodiment, as illustrated in FIG. 3, a method of detecting packet loss in a communication network can comprise incrementing a counter. At 302, a first counter is incremented each time a sequential packet is observed at an observation point in the communication network. For example, the observation node 106 can increment a counter each time a sequential packet is observed.

A first timer can be initiated when the first counter meets an observation threshold at 304. For example, observation node 106 can compare the counter to the observation threshold and when the counter meets the observation threshold, the observation node 106 can initiate a first timer. The observation threshold can comprise a predetermined number of packets in a sequence.

At 306, a first packet can be observed at the observation point. The first packet can comprise a packet that is not the next packet in the data flow sequence or a packet that is the next packet in the data flow sequence.

At 308, the first timer can be re-initiated when the first packet is observed at the observation point before the first timer expires and the first packet comprises a packet in the sequence greater than the last detected packet. For example, when the next packet observed by the observation node 106 is the next packet in the sequence, the observation node can re-initiate the first timer. When the next packet observed by the observation node 106 is a redundant packet of one of the packets already observed, such as the packets used to determine the observation threshold, the timer can continue to run.

A first packet loss can be determined when the first packet is not the next packet in the sequence at 308. For example, when the first packet is greater than the last detected packet yet not the next packet in the sequence, the observation node 106 can determine that a packet loss has occurred. When the first packet is greater than the last detected packet and not yet next packet in the sequence, the observation node 106 can re-initiate the counter and further monitor for the next packet in the sequence.

In an embodiment, the observation node 106 can re-set the counter when the first packet is less than or equal to the last received packet and no packet greater than the last received packet in the sequence is received. For example, the counter is re-set when the next packet in the sequence is not received before the first timer expires, such that the observation node 106 does not initiate the timer again until after the first counter is incremented to meet the observation threshold again.

In another embodiment, observation node 106 can monitor the number of packet loss indications and modify the predetermined number of packets in the observation threshold when the packet counter is re-set a threshold number of times. For example, when the number of times the packet counter is re-set meets the threshold, it can be an indication that the observation threshold is too small such that false positive packet loss indications are being determined. Observation node 106 can increase the predetermined number of packets in the observation threshold such that the length of the packet sequence needed to be observed before the packet loss detection begins is longer.

Figure 4:
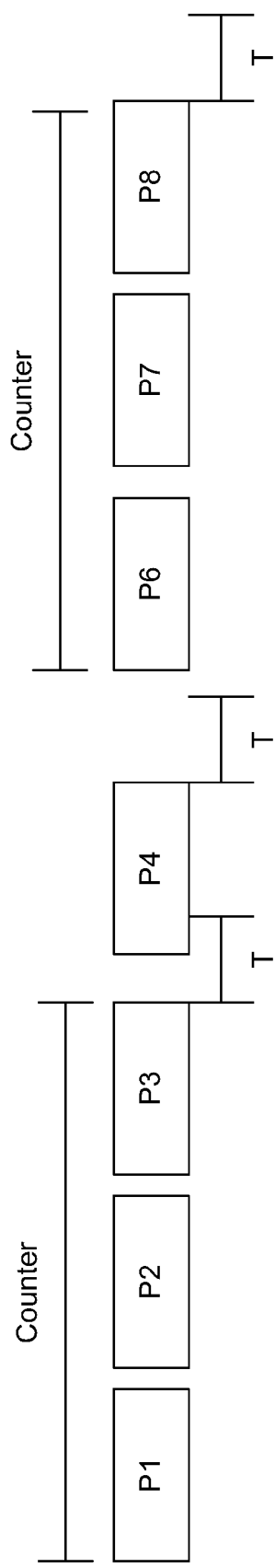
FIG. 4 illustrates exemplary data flow used to detect packet loss in a communication network in accordance with an exemplary embodiment of the present disclosure.

FIG. 4 illustrates an exemplary data flow used to in the method to detect packet loss in a communication network in accordance with an exemplary embodiment of the present disclosure. The following description will be discussed with reference to the exemplary communication system 100 illustrated in FIG. 1. However, the method can be implemented with any suitable communication system. In the exemplary embodiment, the observation threshold can be set to three packets however the observation threshold can be set to be any number of packets greater than one. Observation node 106 can increment a counter for each packet that is received in a sequence for example first packet (P1), second packet (P2), and third packet (P3). Then the observation node 106 can initiate a timer having a first time period T after the third packet (P3) is observed. It is noted that if the initial packets are not received in sequence, the counter is reset and incremented only when successive packets in the sequence are received. Therefore, the packet loss determination cannot be initiated until the observation threshold is successfully met.

When the next packet in the sequence, the fourth packet (P4) is received before time period T expires, the observation node 106 can re-initiate the timer. When the next packet in the sequence (P5) is not received within the time period T, the observation node 106 can re-set the observation threshold counter. When the observation threshold counter is re-set, the observation node 106 does not determine that a packet loss has occurred. After the observation threshold counter is re-set, the observation node 106 can re-increment the counter each time the next packet in the sequence is received (e.g., P6, P7, P8). When the counter meets the observation threshold again, the observation node 106 can initiate the timer again to continue the packet loss detection. The previous description and examples are merely examples and should not be considered to be limiting. The observation threshold can be selected to include any number of packets in a sequence.

Alternatively, if the sixth packet (P6) was received after P4 and before the time period (T) expired, the observation node 106 can determine that a packet loss has occurred and re-set the timer to await the next packet in the sequence (P7).

Figure 5:
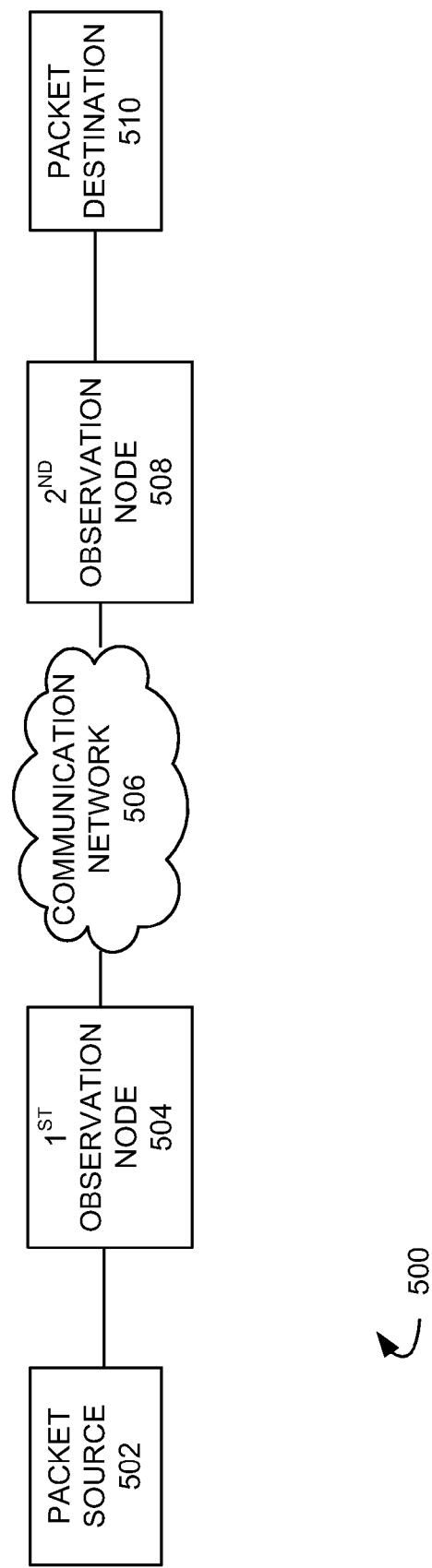
FIG. 5 illustrates another exemplary communication system to detect packet loss in a communication network.

FIG. 5 illustrates an exemplary communication system 500 for detecting packet loss in a communication network. Communication system 500 can comprise a packet source 502, a first observation node 504, a communication network 506, a second observation node 508, and a packet destination 510. Other network elements may be present in the communication system 500 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between packet source 502 and packet destination 510, which are omitted for clarity, including additional processing nodes, routers, gateways, and physical and/or wireless data links for carrying data among the various network elements.

Packet source 502 can be any network device configured to transmit packets over communication system 500. For example, packet source 502 can comprise at least one of a wireless device, a processing node, router, gateway, server, database, base station, base station controller, mobile switching center, dispatch application processor, location register, etc. Packet source 502 can have a wired or wireless interface. Packet source 502 can implement any protocol that uses sequence numbers. For example, packet source 502 can use transport control protocol (TCP), user datagram protocol (UDP), etc.

Packet source 502 can comprise a processor and associated circuitry to execute or direct the execution of computer-readable instructions to obtain information. Packet source 502 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Packet source 502 can receive instructions and other input at a user interface.

Observation nodes 504, 508 can be any network node configured to observe packets transmitted over communication system 500. Observation nodes 504, 508 can be a stand-alone device such as a network monitoring or testing device or observation nodes 504, 508 can be integrated into any other network node within communication system 500. While illustrated as a separate device, observation nodes 504, 508 can be incorporated into packet source 502 and/or packet destination 510. Packets that are transmitted over system 500 can be observed, monitored, and/or detected by observation nodes 504, 508 in order to determine whether packet loss has occurred. Observation nodes 504, 508 can be disposed such that packet loss can be determined at a single point in the network. In other words, packet loss can be determined at each observation node without input from the other observation node. For example, as illustrated in FIG. 5, observation node 504 can be positioned at an output of packet source 502 and observation node 508 can be positioned at an input point of packet destination 510. However, observation node 504 and/or observation node 508 can be positioned at any point in the network.

Observation nodes 504, 508 can comprise a processor and associated circuitry to execute or direct the execution of computer-readable instructions to obtain information. Observation nodes 504, 508 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Observation nodes 504, 508 can receive instructions and other input at a user interface.

Communication network 506 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 506 can be capable of carrying data, for example, to support voice, push-to-talk, and data communications by a packet source 502. Network protocols can comprise wireless protocols such as code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Alternatively, wired network protocols can be utilized by communication network 506 such as Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 506 can also comprise additional base stations, controller nodes, telephony switches, internet routers, network gateways, computer systems, communication links, or some other type of communication equipment, and combinations thereof.

Packet destination 510 can be any network device configured to receive packets over communication system 500. For example, packet destination 510 can comprise at least one of a wireless device, a processing node, router, gateway, server, database, base station, base station controller, mobile switching center, dispatch application processor, location register, etc. Packet destination 510 can have a wired or wireless interface. Packet destination 510 can implement any protocol that uses sequence numbers. For example, packet destination 510 can use transport control protocol (TCP), user datagram protocol (UDP), etc.

Packet destination 510 can comprise a processor and associated circuitry to execute or direct the execution of computer-readable instructions to obtain information. Packet destination 510 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Packet destination 510 can receive instructions and other input at a user interface.

In operation, packet source 502 can transmit a data flow comprising a plurality of packets. The packets can be transmitted such that each packet is associated with a sequence. A first network element, such as observation node 504, can determine that a first group of packets meets an observation threshold. The observation threshold can comprise a predetermined number of packets in a sequence. A first timer can be initiated at the observation node 504 when the first group of packets meets the observation threshold. A first packet can be detected at observation node 504. The first timer can be re-initiated at the observation node 504 when the first packet is detected at the observation node 504 before the first timer expires and the first packet comprises a packet in the sequence greater than a last detected packet. When the first packet is not a next packet in the sequence, the observation node 504 can determine that a first packet loss has occurred.

In addition, a second network element, such as observation node 508, can determine that a second group of packets meets the observation threshold. The observation threshold can comprise a predetermined number of packets in a sequence. A second timer can be initiated at the observation node 508 when the second group of packets meets the observation threshold. A second packet can be detected at observation node 508. The second timer can be re-initiated at the observation node 508 when the second packet is detected at the observation node 508 before the second timer expires and the second packet comprises a packet in the sequence greater than a last detected packet. When the second packet is not the next packet in the sequence, the observation node 508 can determine that a second packet loss has occurred.

When a first packet loss and second packet loss has occurred, the packets indicated as being lost can be compared to determine whether the same packet is being lost throughout the network or if different packets are lost. When different packets are being lost, it could be an indication of a network node deterioration and/or failure.

Figure 6:
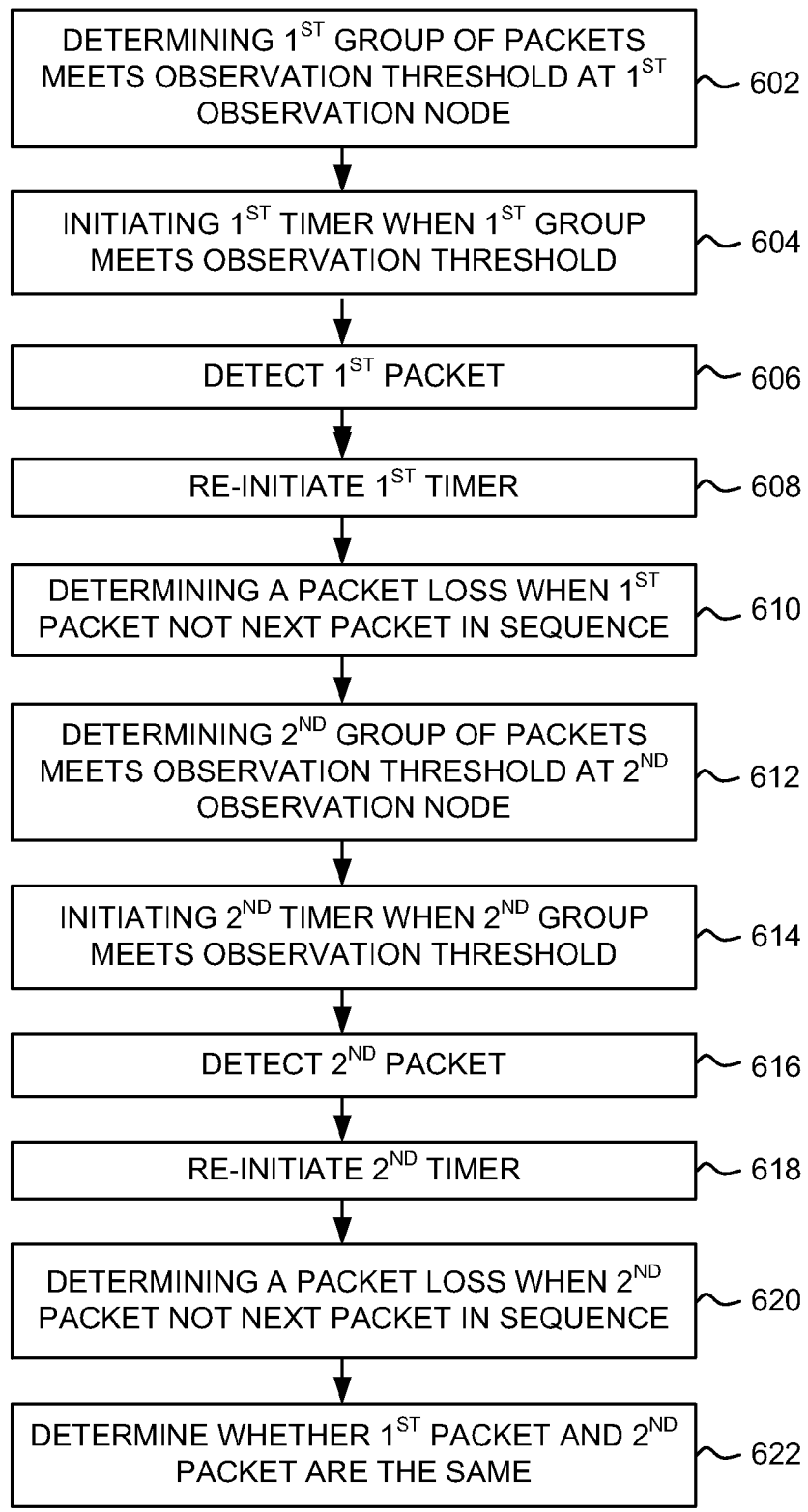
FIG. 6 illustrates another exemplary method of detecting packet loss in a communication network.

FIG. 6 illustrates a flow chart of exemplary methods of detecting packet loss in a communication network. The method will be discussed with reference to the exemplary communication system 500 illustrated in FIG. 5. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A first network node can determine that a first group of packets meets an observation threshold at 602. In other words, until the first group of packets meets the observation threshold, packet loss determination is not initiated. For example, packet source 502 can send a data flow comprising a plurality of packets in a sequence. The observation threshold can comprise a predetermined number of packets in a sequence, where the predetermined number of packets in the sequence is less than the data flow transmitted by packet source 502.

The observation threshold can be selected to comprise any number of packets and can be based on at least one of network conditions, packet protocol, and network load balance sequences. For example, the predetermined number of packets can relate to the size of the data flow such that the predetermined number of packets is enough to prevent false positive packet loss determinations. In an exemplary embodiment, data flows of a significant size generally maintain packet sequence as the data flows are transmitted throughout the network. Data flows comprising a small number of packets tend to initiate false positives during packet loss detection. Therefore, the observation threshold can comprise a predetermined number of packets in a sequence such that when the observation threshold is met, it is indicative of a data flow in which the packet sequence will be maintained as it is transmitted through the system 500.

At 604, a first timer can be initiated when the first group of packets meets the observation threshold. For example, a first timer can be initiated at the first observation node 504 when the number of packets observed by the observation node 504 meets the predetermined number of packets in a sequence. The time period of the timer can be selected based on various factors such as network congestion, round trip packet times, retransmission timeout, communication timeout, and/or rerouting timeout. For example, when the time period is based on the round trip packet time, the time period can be selected to be slightly greater than twice the round trip transmission time such that the observation node 504 can determine that the packet is in fact lost and not just delayed in transmission.

A first packet can be detected at the observation point at 606. The first packet can comprise a packet that is not the next packet in the data flow sequence or a packet that is the next packet in the data flow sequence. When the packet is not the next packet in the data flow sequence, the second packet can be less than or equal to the last received packet or greater than the next packet in the sequence.

The first timer can be re-initiated when the first packet is detected at the first network element before the first timer expires and the first packet comprises a packet in the sequence greater than the last detected packet at 608. For example, when the observation node 504 receives the next packet in the sequence, the first timer can be re-initiated when it is greater than the last received packet which can include packets greater than the last received packet but not the next packet in the sequence.

At 610, a first packet loss can be determined when the first packet is not a next packet in the sequence. When the next packet received is less than or equal to the last packet received, the observation node 504 can re-set the observation threshold after the timer elapses. When the next packet received is the next packet in the sequence or a packet greater than the last packet received, the observation node 504 can determine that a packet loss has occurred and re-set the timer and await the next packet in the sequence.

A second network node can determine that a second group of packets meets the observation threshold at 612. For example, observation node 508 can determine that the second group of packets meets the observation threshold where the second group of packets are associated with the data flow transmitted by packet source 502. In this embodiment, the observation threshold is the same as the observation threshold associated with observation node 504, however the observation threshold of observation node 508 can be different from that of observation node 504 based on network conditions, packet protocols, network load balance sequences, etc.

At 614, a second timer can be initiated when the second group of packets meets the observation threshold. For example, the second observation node 608 can initiate the second timer when the number of packets observed by the observation node 508 meets the predetermined number of packets in the sequence. The timer period of the second timer can be the same or different from the time period of the first timer.

A second packet can be detected at 616. The second packet can comprise a packet that is not the next packet in the data flow sequence or a packet that is the next packet in the data flow sequence. When the packet is not the next packet in the data flow sequence, the second packet can be less than or equal to the last received packet or greater than the next packet in the sequence.

The second timer can be re-initiated when the second packet is detected at the second network element before the second timer expires and the second packet comprises a packet in the sequence greater than the last detected packet at 618. For example, when observation node 508 receives the next packet in the sequence, the second timer can be re-initiated when it is greater than the last received packet which can include packets greater than the last received packet but not the next packet in the sequence.

At 620, a second packet loss can be determined when the second packet is not a next packet in the sequence. When the next packet received is less than or equal to the last packet received, the observation node 508 can re-set the observation threshold after the timer elapses. When the next packet received is the next packet in the sequence or a packet greater than the last packet received, the observation node 508 can determine that a packet loss has occurred and re-set the timer and await the next packet in the sequence.

A determination can be made as to whether the first packet and the second packet are the same packet at 622 When the next packet received is less than or equal to the last packet received, the observation node 504 can re-set the observation threshold after the timer elapses. When the next packet received is the next packet in the sequence or a packet greater than the last packet received, the observation node 504 can determine that a packet loss has occurred and re-set the timer and await the next packet in the sequence. For example, it can be determined whether the first packet received at observation node 504 and the second packet received at observation node 508 are the same or different packets. When the first packet and the second packet are the same packet, it can provide further support of a successful packet loss determination rather than a false positive determination of the packet loss. On the other hand, if the first packet and the second packet are different, system 500 can determine a packet loss has occurred between observation node 504 and 508. System 500 can use that information to further determine the source of the packet loss.

Alternatively, when the first packet and the second packet are different packets, then system 500 can determine that at least one of the packet loss determinations may be a false positive where the false positives could be an indication of a network device deterioration and/or failure, network congestion, etc.

Figure 7:
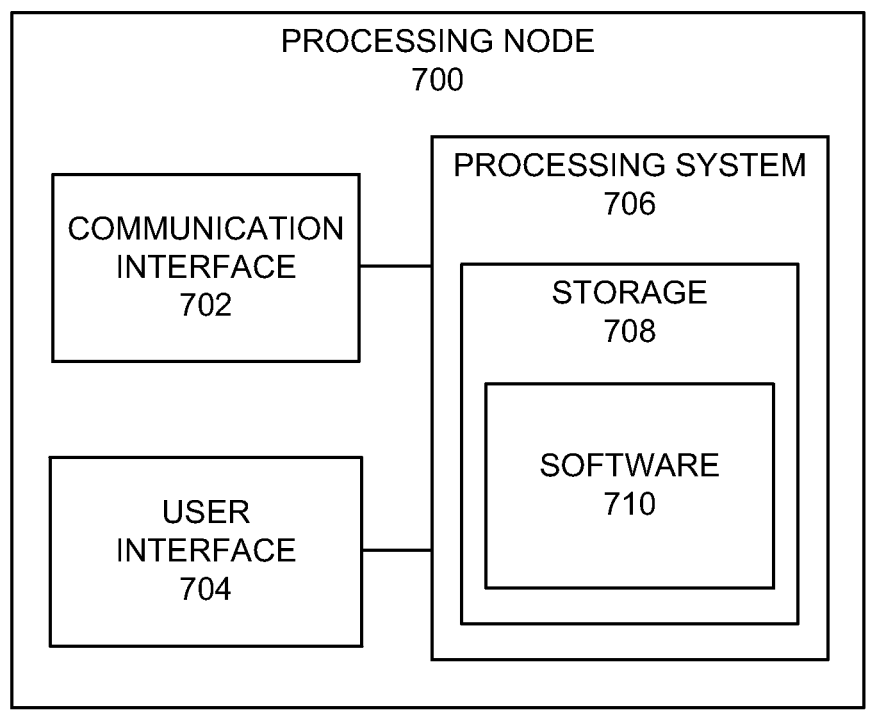
FIG. 7 illustrates an exemplary processing node according to an exemplary embodiment of the present disclosure.

FIG. 7 illustrates an exemplary processing node 700 in a communication system. Processing node 700 comprises communication interface 702, user interface 704, and processing system 706 in communication with communication interface 702 and user interface 704. Processing node 700 is capable of monitoring communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include packet sources 102, 502, observation nodes 106, 504, 508, and packet destinations 108, 510. Processing node 700 can also be an adjunct or component of a network element, such as an element of packet sources 102, 502, observation nodes 106, 504, 508, and packet destinations 108, 510. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of detecting packet loss in a communication network, comprising:
    determining at a first network element that a first group of packets meets an observation threshold, wherein the observation threshold comprises a predetermined number of packets in a sequence, and wherein the predetermined number is based on a size of the sequence;
    initiating a first timer when the first group of packets meets the observation threshold;
    detecting a first packet at the first network element after the first timer is initiated and before the first timer expires;
    upon determining that the first packet is greater in the sequence than a first last-detected packet but not a sequential packet, determining a first packet loss and re-initiating the first timer;
    determining at a second network element that a second group of packets meets the observation threshold;
    initiating a second timer when the second group of packets meets the observation threshold;
    detecting a second packet at the second network element after the second timer is initiated and before the second timer expires;
    upon determining that the second packet is greater in the sequence than a second last-detected packet but not a sequential packet, determining a second packet loss and re-initiating the second timer; and
    comparing the first packet loss determination with the second packet loss determination to determine whether the first packet and second packet are the same packet in the sequence.

2. The method of claim 1, wherein the first timer continues to elapse when the first packet does not comprise a packet in the sequence greater than the last detected packet.

3. The method of claim 1, wherein the predetermined number of packets in the sequence is based on at least one of network conditions and packet protocol.

4. The method of claim 1, wherein the observation threshold is greater than a network-defined transport size.

5. A method of detecting packet loss in a communication network, comprising:
    incrementing a first counter each time a sequential packet is observed at an observation point in the communication network;
    initiating a first timer when the first counter meets an observation threshold, wherein the observation threshold comprises a predetermined number of packets in a sequence, and wherein the predetermined number is based on a size of the sequence;
    observing a first packet at the observation point after the first timer is initiated and before the first timer expires;
    upon determining that the first packet is greater in the sequence than the last-detected packet but not a sequential packet, determining a first packet loss and re-initiating the first timer;
    re-setting the first counter when the next packet in the sequence is not observed at the observation point before the first timer expires;
    incrementing the first counter each time a sequential packet is observed at the observation point after the first counter has been re-set;

initiating the first timer when the first counter meets the observation threshold;

observing a second packet at the observation point after the first timer is initiated;

upon determining that the second packet is greater in the sequence than the last-detected packet but not a sequential packet, determining a second packet loss and re-initiating the first timer; and re-determining the predetermined number of packets in a sequence when the first packet counter is re-set a threshold number of times.

6. The method of claim 5, wherein the first timer continues to elapse when the first packet does not comprise a packet in the sequence greater than the last detected packet.

7. The method of claim 5, wherein the predetermined number of packets in the sequence is based on at least one of network conditions and packet protocol.

8. The method of claim 5, wherein the observation threshold is greater than a network-defined transport size.

9. The method of claim 5, wherein the sequence is based on information stored in a header of each packet.

10. A system for detecting packet loss in a communication network, comprising:

a processing node; and a processor coupled to the processing node, the processor being configured to:

increment a first counter each time a sequential packet is observed at an observation point in the communication network;

initiate a first timer when the first counter meets an observation threshold, wherein the observation threshold comprises a predetermined number of packets in a sequence, and wherein the predetermined number is based on a size of the sequence;

receive an indication of a first packet observed at the observation point after the first timer is initiated and before the first timer expires;

upon determining that the first packet is greater in the sequence than the last-detected packet but not a sequential packet, determine a first packet loss and re-initiate the first timer;

re-set the first counter when the next packet in the sequence is not observed at the observation point before the first timer expires;

increment the first counter each time a sequential packet is observed at the observation point after the first counter has been re-set;

initiate the first timer when the first counter meets the observation threshold;

receive an indication of a second packet observed at the observation point after the first timer is initiated;

upon determining that the second packet is greater in the sequence than the last-detected packet but not a sequential packet, determine a second packet loss and re-initiate the first timer; and re-determine the predetermined number of packets in a sequence when the first packet counter is re-set a threshold number of times.

11. The system of claim 10, wherein the first timer continues to elapse when the first packet does not comprise a packet in the sequence greater than the last detected packet.

12. The system of claim 10, wherein the predetermined number of packets in the sequence is based on at least one of network conditions and packet protocol.

13. The system of claim 10, wherein the observation threshold is greater than a network-defined transport size.

14. The system of claim 10, wherein the sequence is based on information stored in a header of each packet.

* * * * *